(12) United States Patent
Passov et al.

(10) Patent No.: US 11,583,942 B2
(45) Date of Patent: Feb. 21, 2023

(54) REVERSIBLE SQUARE-SHAPED CUTTING INSERT AND ROTARY CUTTING TOOL

(71) Applicant: ISCAR, LTD., Tefen (IL)

(72) Inventors: Alexander Passov, Haifa (IL);
Alexander Bronshteyn, Nahariya (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 17/392,850

(22) Filed: Aug. 3, 2021

(65) Prior Publication Data

US 2022/0118533 A1 Apr. 21, 2022

Related U.S. Application Data

(60) Provisional application No. 63/093,464, filed on Oct. 19, 2020.

(51) Int. Cl.
*B23C 5/20* (2006.01)
*B23C 5/22* (2006.01)
*B23C 5/06* (2006.01)

(52) U.S. Cl.
CPC ............. *B23C 5/202* (2013.01); *B23C 5/06* (2013.01); *B23C 2200/0461* (2013.01);
(Continued)

(58) Field of Classification Search
CPC .... B23B 2200/3681; B23C 2200/3691; B23C 2200/0455; B23C 2200/0461;
(Continued)

(56) References Cited

U.S. PATENT DOCUMENTS 3,142,110 A * 7/1964 Hertel ................. B23B 27/1603
407/109
4,074,949 A * 2/1978 Hochmuth .......... B23B 27/1614
407/100
(Continued)

FOREIGN PATENT DOCUMENTS

JP 58051011 A * 3/1983
JP H09207007 8/1997
(Continued)

OTHER PUBLICATIONS

International Search Report dated Jan. 21, 2022, issued in PCT counterpart application (No. PCT/IL2021/051149).
(Continued)

*Primary Examiner* — Nicole N Ramos
(74) *Attorney, Agent, or Firm* — Womble Bond Dickinson (US) LLP

(57) ABSTRACT

In a cutting tool rotatable about a tool axis, a reversible cutting insert is removably secured in a tool body. The cutting insert has opposing top and bottom end surfaces interconnected by a peripheral surface, and a median plane located therebetween. The peripheral surface includes four side surfaces alternating with four corner surfaces, the side and corner surfaces intersecting the top surface to form top major cutting edges and top corner cutting edges, respectively. Each side surface has a median surface and a top major relief surface. Each top major relief surface forms an acute internal top major relief angle with the median plane, and the median plane intersects the four median surfaces to define an imaginary median square. In a top end view of the cutting insert, the four top major cutting edges define an imaginary top major square rotationally offset from the imaginary median square.

25 Claims, 8 Drawing Sheets

(52) U.S. Cl.
CPC .. *B23C 2200/086* (2013.01); *B23C 2200/128* (2013.01); *B23C 2210/246* (2013.01)

(58) Field of Classification Search
CPC ........ B23C 2200/086; B23C 2200/126; B23C 2200/128; B23C 2210/168; B23C 2210/246; B23C 5/06; B23C 5/20; B23C 5/202; B23C 5/2213
See application file for complete search history.

(56) References Cited

U.S. PATENT DOCUMENTS

| | | | |
|---|---|---|---|
| 4,294,565 A * | 10/1981 | Erkfritz | B23C 5/202 407/62 |
| 5,199,827 A * | 4/1993 | Pantzar | B23C 5/2213 407/42 |
| 5,807,031 A | 9/1998 | Arai et al. | |
| 7,232,279 B2 | 6/2007 | Smilovici et al. | |
| 7,241,082 B2 * | 7/2007 | Smilovici | B23C 5/2213 407/115 |
| 7,604,441 B2 | 10/2009 | Bhagath | |
| 7,758,287 B2 * | 7/2010 | Alm | B23C 5/202 407/115 |
| 8,454,277 B2 * | 6/2013 | Dudzinsky | B23C 5/2204 407/103 |
| 8,491,234 B2 | 7/2013 | Fang et al. | |
| 8,641,331 B2 | 2/2014 | Zastrozynski et al. | |
| 8,834,075 B2 * | 9/2014 | Choi | B23C 5/202 407/42 |
| 9,724,770 B2 | 8/2017 | Cheon | |
| 9,975,188 B2 * | 5/2018 | Roman | B23C 5/06 |
| 11,311,949 B2 * | 4/2022 | Zhang | B23C 5/06 |
| 2007/0003384 A1 | 1/2007 | Smilovici et al. | |
| 2008/0226403 A1 * | 9/2008 | Craig | B23C 5/202 407/113 |
| 2013/0129432 A1 | 5/2013 | Jaeger et al. | |
| 2014/0064864 A1 * | 3/2014 | Kaufmann | B23B 27/1611 407/113 |
| 2014/0341660 A1 | 11/2014 | Cheon | |
| 2017/0120351 A1 * | 5/2017 | Fang | B23C 5/205 |

FOREIGN PATENT DOCUMENTS

| | | |
|---|---|---|
| JP | 2008018515 A * | 1/2008 |
| JP | 2014-083632 | 5/2014 |

OTHER PUBLICATIONS

Written Opinion dated Jan. 21, 2022, issued in PCT counterpart application (No. PCT/IL2021/051149).

* cited by examiner

REVERSIBLE SQUARE-SHAPED CUTTING INSERT AND ROTARY CUTTING TOOL

RELATED APPLICATIONS

Priority is claimed to U.S. Provisional Patent Application No. 63/093,464 filed Oct. 19, 2020. The contents of the aforementioned application are incorporated by reference in their entirety.

FIELD OF THE INVENTION

The present invention relates to cutting inserts and cutting tools for use in metal cutting processes, in general, and to rotatable cutting tools having reversible cutting inserts for milling operations, in particular.

BACKGROUND OF THE INVENTION

Within the field of rotatable cutting tools used in milling operations, there are many examples of reversible cutting inserts being removably secured in a cutting body. In some instances, the cutting inserts are square-shaped inserts.

U.S. Pat. No. 7,604,441 discloses a fully indexable square cutting insert having four side surfaces connecting to two end surfaces. At the intersection of each side surface with an end surface is a primary cutting edge which extends from an insert corner and along a first side surface, in a downward direction towards a median plane. A wiper extends from the same insert corner and along an adjacent side surface, in an upward direction away from the median plane, to rise above an abutment surface of an associated end surface. The geometry of the cutting insert and of the insert pocket in which the insert is seated are such that the primary cutting edge has a positive axial angle (helix), while the insert has an overall negative axial angle for providing axial clearance and an overall negative radial angle for providing radial clearance.

U.S. Pat. No. 8,491,234 discloses a double-sided cutting insert with a plurality of indexable convex cutting edges. The cutting insert has a top face and a bottom face, at least three convex cutting edges on each face connected by at least three nose corners, at least three peripheral side surfaces extending from each face toward a virtual middle plane; and a common lateral seating surface on each peripheral side surface. Each convex cutting edge has at least a curved cutting edge region, and further has a primary substantially straight cutting edge region intermediate the curved cutting edge region and the nose corner. Each peripheral side surface further has a primary planar facet associated with the primary substantially straight cutting edge, and each face is single-handed in same direction. Additionally, in various embodiments, the top and bottom faces of the cutting insert may be formed such that they are twisted or rotated with respect to each other.

U.S. Pat. No. 8,641,331 discloses a milling cutting insert having a square or triangular shaped cutting face delimited in the plan view by a peripheral cutting edge having linear cutting edges and curved cutting corners. Each of the cutting edges comprises an inclined region sloping toward a cutting corner, extending beyond the tangential point determined by the point at which the linear cutting edge transitions into a curved cutting corner, wherein adjacent thereto the cutting edge rises prior to the point determined by a cutting corner angle bisector, wherein said rising region extends to a cutting edge maximum on the other side of the cutting corner on the adjacent cutting edge, which is linear in plan view, from where the cutting edge continues, again inclined and sloping downward, resulting in a rotationally symmetric form having identically shaped cutting edges.

U.S. Pat. No. 9,724,770 discloses a double-sided cutting insert for milling which having eight main cutting edges and eight wiper edges. The cutting insert includes top and bottom faces and four side faces. Each side face includes first and second sub-faces inclined with respect to each other. The first sub-face has a main cutting edge adjacent to the top face and a wiper edge adjacent to the bottom face. The second sub-face has a wiper edge adjacent to the top face and a main cutting edge adjacent to the bottom face. The wiper edge of the second sub-face is inclined inwardly relative to the cutting insert with respect to the main cutting edge of the first sub-face. The wiper edge of the first sub-face is inclined inwardly relative to the cutting insert with respect to the main cutting edge of the second sub-face.

It is an object of the present invention to provide an improved reversible cutting insert having four major cutting edges per end surface.

It is also an object of the present invention to provide an improved reversible cutting insert having robust cutting edges.

It is a further object of the present invention to provide an improved rotatable cutting tool in which the cutting insert is removably secured in a tool body with a high level of stability.

It is still a further object of the present invention to provide an improved rotatable cutting tool in which an increased number of cutting inserts are circumferentially spaced around the tool body.

It is yet still a further object of the present invention to provide an improved rotatable cutting tool capable of performing square shoulder milling operations.

SUMMARY OF THE INVENTION

In accordance with one aspect of the present invention, there is provided a reversible cutting insert, comprising:
  opposing top and bottom end surfaces interconnected by a continuous peripheral surface, with a median plane located between the top and bottom end surfaces and intersecting the peripheral surface to form an insert boundary line, and an insert axis perpendicular to the median plane about which the cutting insert is indexable,
    the peripheral surface including four side surfaces circumferentially alternating with four corner surfaces,
    the side and corner surfaces intersecting the top end surface at top side and top corner edges, respectively, with each top side edge having a top major cutting edge, and each top corner edge having a top corner cutting edge, and
    each side surface including a median surface, and a top major relief surface adjacent the respective top major cutting edge,
  wherein:
    in a cross-sectional view taken along one of the top major cutting edges, the respective top major relief surface forms an acute internal top major relief angle with the median plane, and
    the median plane intersects the four median surfaces to define an imaginary median square having an imaginary inscribed median circle with a median diameter and a center coincident with the insert axis,
    and wherein, in a top end view of the cutting insert:

the four top major cutting edges define an imaginary top major square having an imaginary inscribed top major circle with a top major diameter and a center coincident with the insert axis, and the imaginary top major square is rotationally offset from the imaginary median square about the insert axis.

In accordance with another aspect of the invention, there is provided a cutting tool rotatable about a tool axis in a direction of rotation, comprising:

a tool body extending in a forward-to-rearward direction along the tool axis; and at least one reversible cutting insert of the sort described above removably secured in an insert receiving pocket of the tool body, wherein:

one of the top corner cutting edges of each cutting insert is operative, and one of the top major cutting edges of each cutting insert, adjacent the operative top corner cutting edge, is an operative top major cutting edge.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
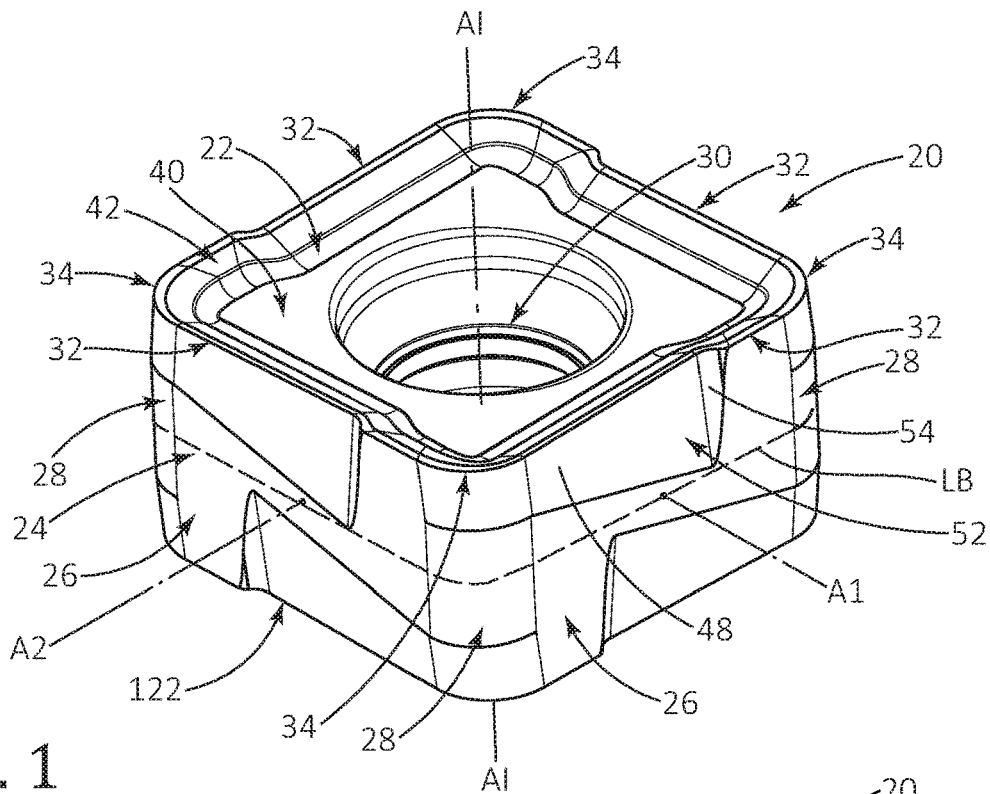
FIG. 1 is a perspective view of a cutting insert in accordance with some embodiments of the present invention.
Figure 2:
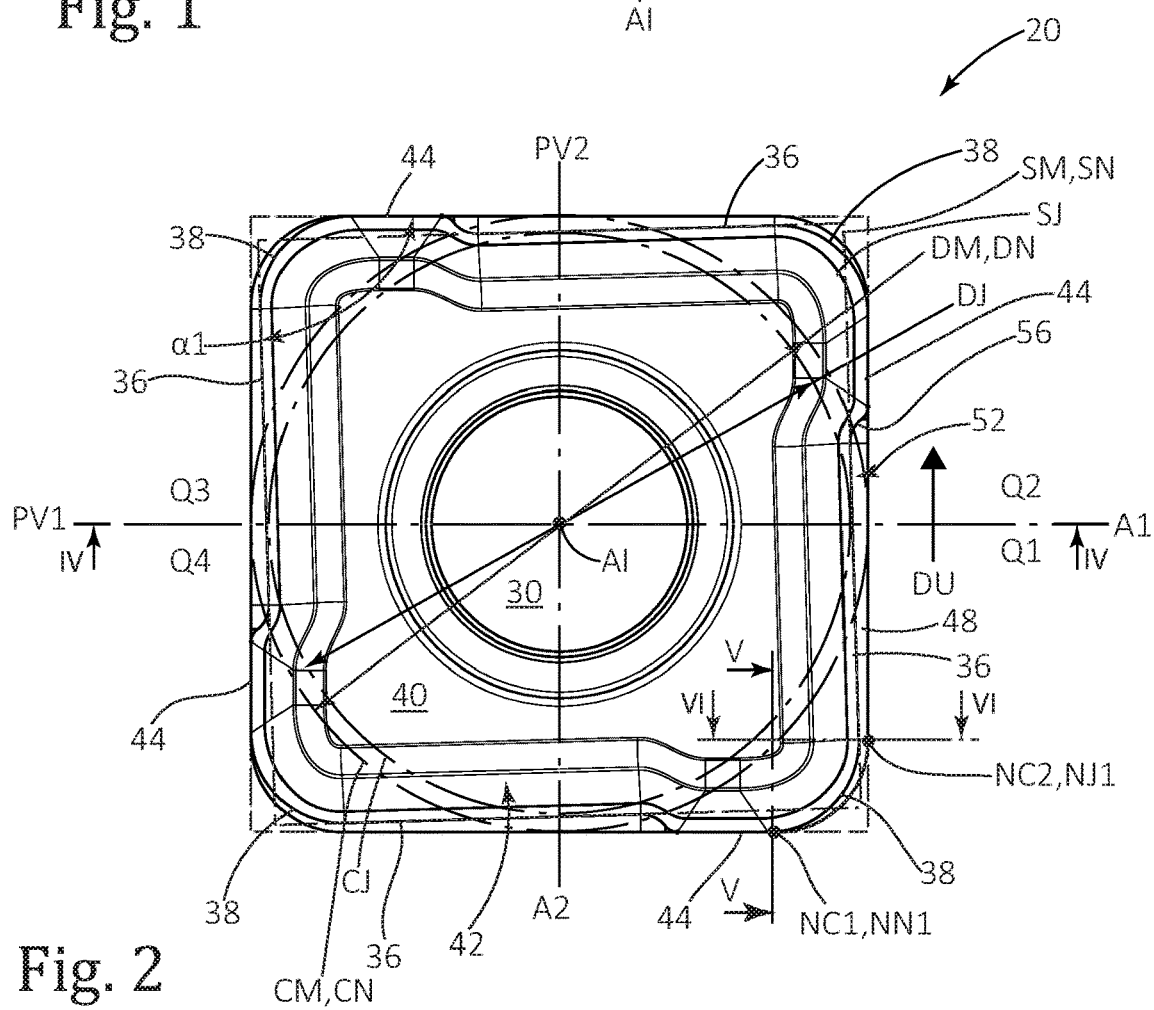
FIG. 2 is an end view of the cutting insert shown in FIG. 1.
Figure 3:
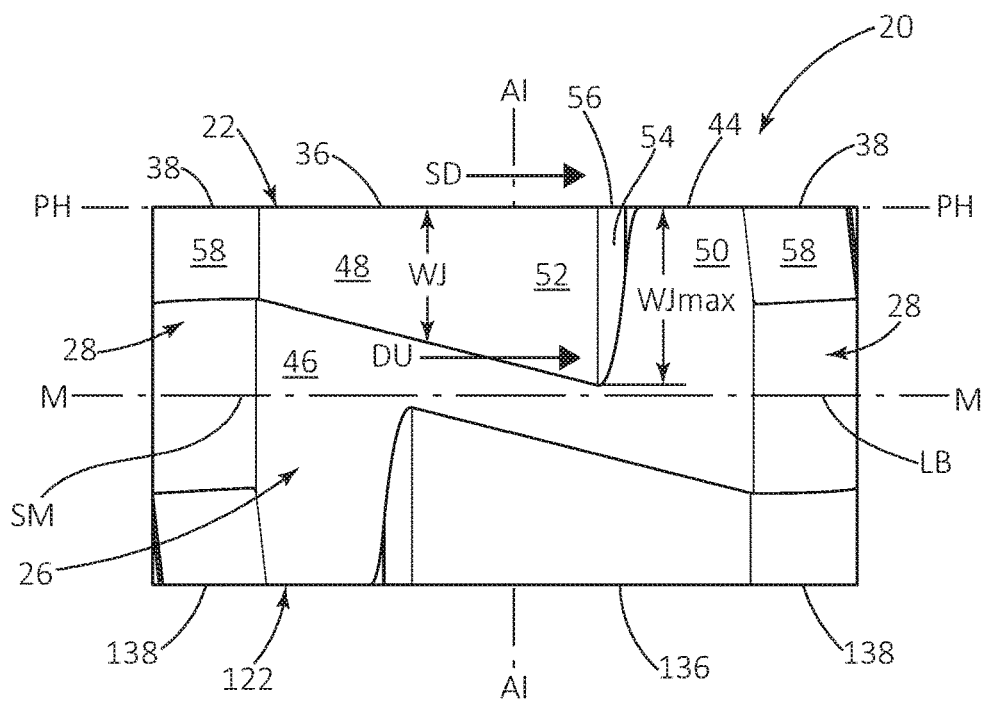
FIG. 3 is a side view of the cutting insert shown in FIG. 1.

One aspect of the present invention relates to a reversible cutting insert 20, as shown in FIGS. 1 to 3, having opposing top and bottom end surfaces 22, 122 interconnected by a continuous peripheral surface 24, the peripheral surface 24 including four side surfaces 26 circumferentially alternating with four corner surfaces 28.

In some embodiments of the present invention, the cutting insert 20 may preferably be manufactured by form pressing and sintering a cemented carbide, such as tungsten carbide, and may be coated or uncoated.

As shown in FIG. 3, the cutting insert 20 has a median plane M located between the top and bottom end surfaces 22, 122 and intersecting the peripheral surface 24 to form an insert boundary line LB.

In some embodiments of the present invention, the median plane M may be located halfway between the top and bottom end surfaces 22, 122.

Also, in some embodiments of the present invention, the cutting insert 20 may be configured such that in an end view, as shown in FIG. 2, no portion of the cutting insert 20 extends outside the insert boundary line LB.

As shown in FIGS. 1 to 3, the cutting insert 20 has an insert axis AI perpendicular to the median plane M, about which the cutting insert 20 is indexable.

In some embodiments of the present invention, a through bore 30 coaxial with the insert axis AI may intersect the top and bottom end surfaces 22, 122.

Also, in some embodiments of the present invention, the cutting insert 20 may be manufactured by direct pressing along the direction of the insert axis AI.

Further, in some embodiments of the present invention, the cutting insert 20 may be pressed into its final shape, and the peripheral surface 24 may be unground.

As shown in FIGS. 1 to 3, the side and corner surfaces 26, 28 intersect the top end surface 22 at top side and top corner edges 32, 34, respectively, with each top side edge 32 having a top major cutting edge 36, and each top corner edge 34 having a top corner cutting edge 38.

In some embodiments of the present invention, each top corner cutting edge 38 may be curved.

Also, in some embodiments of the present invention, each top major cutting edge 36 may tangentially adjoin one of the top corner cutting edges 38.

As shown in FIG. 3, the four top major cutting edges 36 may be entirely contained in a top horizontal plane PH perpendicular to the insert axis AI.

In some embodiments of the present invention, the four top corner cutting edges 38 may be entirely contained in the top horizontal plane PH.

As shown in FIGS. 1 to 4, the top end surface 22 may have a top central surface 40, and the top central surface 40 may be located between the median plane M and the top horizontal plane PH.

In some embodiments of the present invention, the top central surface 40 may be perpendicular to the insert axis AI.

Also, in some embodiments of the present invention, the through bore 30 may intersect the top central surface 40.

As shown in FIGS. 1 and 2, the top end surface 22 may include a top rake surface 42 extending adjacent the top side and top corner edges 32, 34.

In some embodiments of the present invention, the top rake surface 42 may surround the top central surface 40.

As shown in FIGS. 1 to 3, each top side edge 32 may include a top minor cutting edge 44.

In some embodiments of the present invention, the four top minor cutting edges 44 may be entirely contained in the top horizontal plane PH.

Also, in some embodiments of the present invention, the top side and top corner edges 32, 34 may be entirely contained in the top horizontal plane PH.

As shown in FIGS. 1 and 3, each side surface 26 includes a median surface 46, and each side surface 26 also includes a top major relief surface 48 adjacent the respective top major cutting edge 36.

In some embodiments of the present invention, each median surface 46 may be perpendicular to the median plane M.

Also, in some embodiments of the present invention, each top major relief surface 48 may intersect the top end surface 22 to form the respective top major cutting edge 36.

Further, in some embodiments of the present invention, each top major relief surface 48 may not be intersected by the median plane M.

Figure 4:
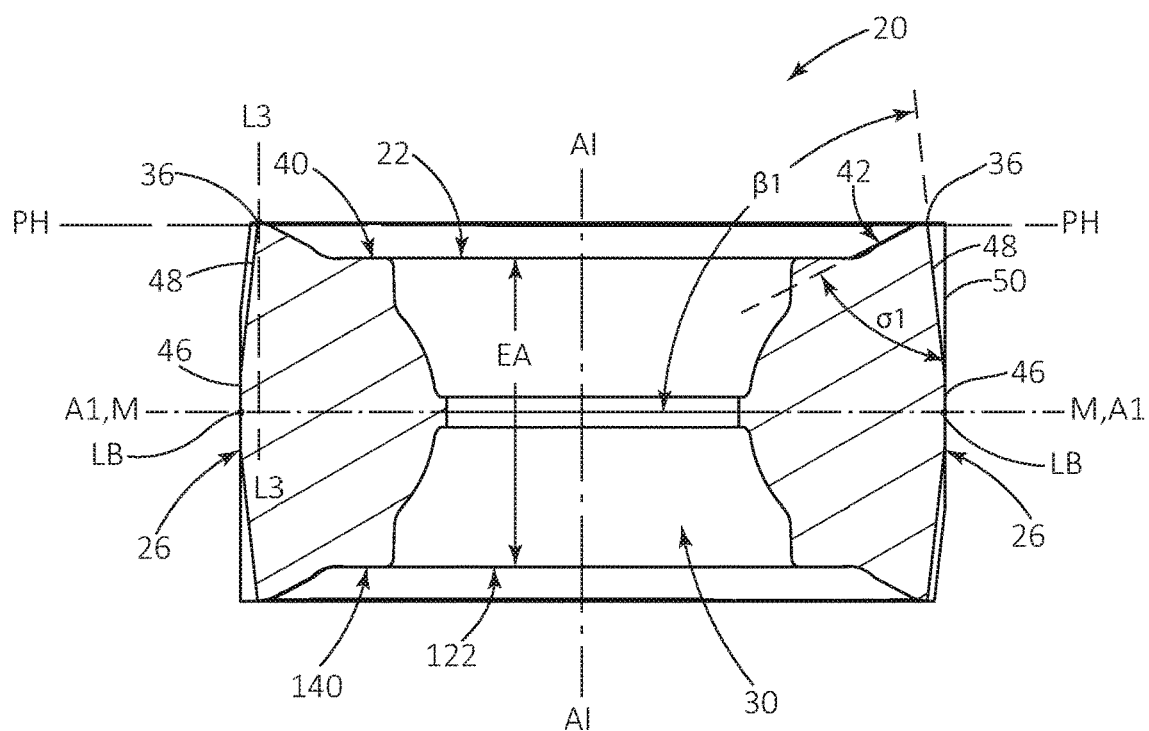
FIG. 4 is a cross-sectional view of the cutting insert shown in FIG. 2, taken along the line IV-IV.

As shown in FIG. 4, in a cross-sectional view taken along one of the top major cutting edges 36, the respective top major relief surface 48 forms an acute internal top major relief angle β1 with the median plane M.

Also, as shown in FIG. 4, the said cross-sectional view taken along one of the top major cutting edges 36 may contain the insert axis AI.

It should be appreciated that use of the terms "internal angle" and "external angle" throughout the description and claims refers to an angle between two linear features as measured internal and external to the member on which at least one of the linear features is formed, respectively.

It should also be appreciated that each top major relief surface 48, also known as a 'reversed' relief surface, generally extends outwardly (i.e., in a direction away from the insert axis AI) from its respective top major cutting edge 36 towards the median plane M, so that each top major cutting edge 36 is beneficially supported and advantageously robust.

In some embodiments of the present invention, each top major relief surface 48 may be planar.

Also, in some embodiments of the present invention, the top major relief angle β1 may have a minimum value of 75 degrees and a maximum value of 85 degrees, i.e. $75° ≤ β1 ≤ 85°$.

For embodiments of the present invention in which the top major relief angle β1 associated with each top major relief surface 48 has a minimum value of 75 degrees and a maximum value of 85 degrees, it should be appreciated that each top major cutting edge 36 is beneficially supported and advantageously robust.

As shown in FIG. 4, in the cross-sectional view taken along one of the top major cutting edges 36, the respective top major relief surface 48 may form an acute internal top major rake angle σ1 with the top rake surface 42.

In some embodiments of the present invention, the top major rake angle σ1 may have a minimum value of 65 degrees and a maximum value of 75 degrees, i.e. $65° ≤ σ1 ≤ 75°$.

As shown in FIG. 3, in a side view of the cutting insert 20, the top major relief surface 48 (visible in this view) may have a variable top major relief width WJ parallel to the insert axis AI, and the top major relief width WJ may increase in a sideways direction SD parallel to the median plane M In some embodiments of the present invention, the top major relief width WJ may continuously increase in the sideways direction SD, along the entire length of the respective top major cutting edge 36.

As shown in FIG. 3, in the side view of the cutting insert 20, the sideways direction SD may be from the top major cutting edge 36 to the top minor cutting edge 44 of the same top side edge 32.

Also, as shown in FIG. 3, each side surface 26 may include a top minor relief surface 50 adjacent the respective top minor cutting edge 44.

In some embodiments of the present invention, each top minor relief surface 50 may intersect the top end surface 22 to form the respective top minor cutting edge 44.

Figure 5:
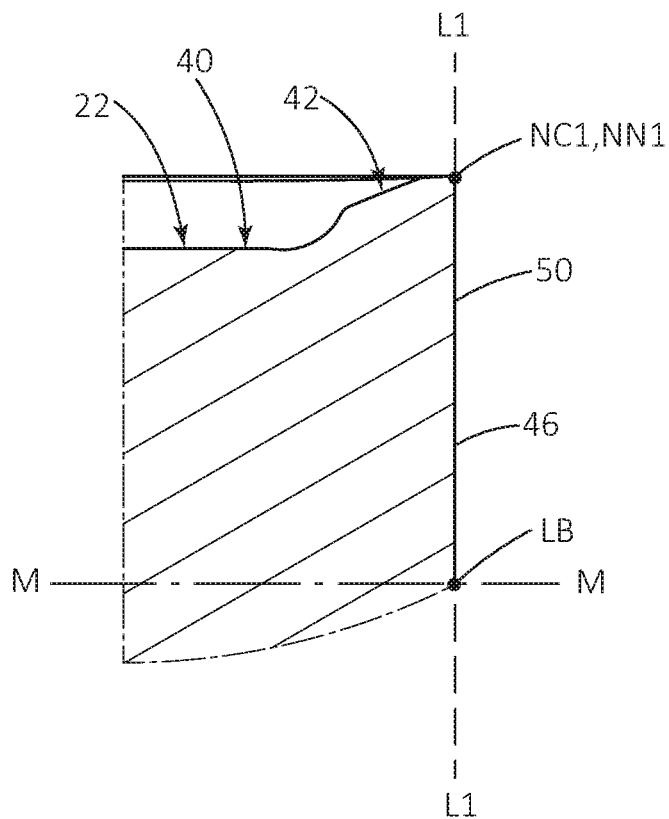
FIG. 5 is a partial cross-sectional view of the cutting insert shown in FIG. 2, taken along the line V-V.

As shown in FIG. 5, in a cross-sectional view taken along one of the top minor cutting edges 44, the respective top minor relief surface 50 may be perpendicular to the median plane M.

In some embodiments of the present invention, each top minor relief surface 50 may be coplanar with its associated median surface 46.

As shown in FIG. 2, the median plane M intersects the four median surfaces 46 to define an imaginary median square SM having an imaginary inscribed median circle CM with a median diameter DM.

Also, as shown in FIG. 2, it should be appreciated that the imaginary inscribed median circle CM has a center coincident with the insert axis AI.

Further, as shown in FIG. 2, the imaginary median square SM may be divided into four identical quadrants Q1, Q2, Q3, Q4 by mutually perpendicular first and second vertical planes PV1, PV2 containing the insert axis AI and intersecting the four side surfaces 26.

In some embodiments of the present invention, each top major cutting edge 36 may be located in, or span, two of the four quadrants Q1, Q2, Q3, Q4.

Also, in some embodiments of the present invention, each top major relief surface 48 may be located in, or span, two of the four quadrants Q1, Q2, Q3, Q4.

Further, in some embodiments of the present invention, each top corner cutting edge 38 may be located in only one of the four quadrants Q1, Q2, Q3, Q4.

Yet further, in some embodiments of the present invention, each top minor cutting edge 44 may be located in only one of the four quadrants Q1, Q2, Q3, Q4.

As shown in FIG. 2, in a top end view of the cutting insert 20, the four top major cutting edges 36 define an imaginary top major square SJ having an imaginary inscribed top major circle CJ with a top major diameter DJ.

Also, as shown in FIG. 2, it should be appreciated that the imaginary inscribed top major circle CJ has a center coincident with the insert axis AI.

Further, as shown in FIG. 2, in the top end view of the cutting insert 20, the imaginary top major square SJ is rotationally offset from the imaginary median square SM about the insert axis AI. In the present application, "rotationally offset" means that both squares SJ and SM are centered about the index axis AI, but the sides of one of the squares are not parallel to the sides of the other square.

In some embodiments of the present invention, the median diameter DM may be greater than the top major diameter DJ.

Also, in some embodiments of the present invention, a maximum top major relief width $WJ_{MAX}$ of each top major relief surface 48 may be greater than twenty percent of the top major diameter DJ, i.e. $WJ_{MAX} > 0.20*DJ$.

Further, in some embodiments of the present invention, the maximum top major relief width $WJ_{MAX}$ may be greater than twenty percent of the median diameter DM, i.e. $WJ_{MAX} > 0.20*DM$.

For embodiments of the present invention in which the maximum top major relief width $WJ_{MAX}$ of each top major relief surface 48 is greater than twenty percent of the top major diameter DJ, it should be appreciated that each top major cutting edge 36 is advantageously robust.

As shown in FIGS. 1, 2 and 4, the through bore 30 has a bore axial extent EA from the top end surface 22 to the bottom end surface 122.

In some embodiments of the present invention, the bore axial extent EA may be greater than forty percent of the top major diameter DJ, i.e. EA>0.40*DJ.

Also, in some embodiments of the present invention, the bore axial extent EA may be greater than forty percent of the median diameter DM, i.e. EA>0.40*DM.

As shown in FIG. 2, the four top minor cutting edges 44 may define an imaginary top minor square SN having an imaginary inscribed top minor circle CN with a top minor diameter DN.

As shown in FIG. 2, in the top end view of the cutting insert 20, the imaginary top minor square SN may be coincident with the imaginary median square SM.

For embodiments of the present invention in which the imaginary top minor square SN is coincident with the imaginary median square SM, it should be appreciated that the median diameter DM may be equal to the top minor diameter DN.

As best seen in the top end view of FIG. 2, the imaginary top major square SJ is nested within the imaginary top minor square SN. Thus, in the end view of the insert 20, the top major cutting edge 36 of a given top side edge 32 is recessed relative to the top minor cutting edge 44 of that same top side edge 32. Furthermore, in some embodiments, in the top end view, the top major cutting edge 36 is longer than the top minor cutting edge 44.

As shown in FIGS. 1 to 3, each top corner cutting edge 36 has first and second corner end points NC1, NC2.

In some embodiments of the present invention, each first corner end point NC1 may be coincident with a first minor end point NN1 of one of the top minor cutting edges 44, and each second corner end point NC2 may be coincident with a first major end point NJ1 of one of the top major cutting edges 36.

As shown in FIG. 2, in the top end view of the cutting insert 20, the top major and top minor cutting edges 36, 44 associated with each top corner cutting edge 38 may form an acute internal top corner angle α1.

In some embodiments of the present invention, the top corner angle α1 may have a value greater than 80 degrees, i.e. α1>80°.

As shown in FIGS. 1 to 3, each side surface 26 may have a top undercut 52 formed with respect to an undercut direction DU parallel to the associated side of the imaginary median square SM It should be appreciated that use of the term "undercut" throughout the description and claims refers to a recess, where a straight line extending in a certain undercut direction from a given sub-surface of the recess intersects another sub-surface of the same recess.

In some embodiments of the present invention, each top undercut 52 may be recessed relative to an associated top minor relief surface 50.

Also, in some embodiments of the present invention, each top major relief surface 48 may be disposed in the top undercut 52 of the respective side surface 26.

As shown in FIGS. 1 to 3, each top undercut 52 may include a top joining surface 54. The top joining surface 54 may connect the top major relief surface 48 to the top minor relief surface 50.

In some embodiments of the present invention, each top joining surface 54 may intersect the top end surface 22 at a top joining edge 56.

Also, in some embodiments of the present invention, each top joining edge 56 may extend between the top major cutting edge 36 and the top minor cutting edge 44 associated with the same top side edge 32.

Further, in some embodiments of the present invention, each top joining edge 56 may be a non-cutting edge.

Figure 6:
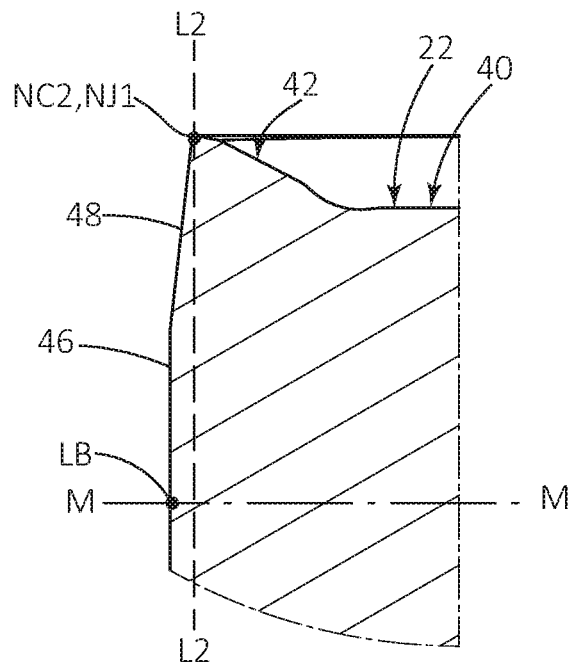
FIG. 6 is a partial cross-sectional view of the cutting insert shown in FIG. 2, taken along the line VI-VI.

As shown in FIGS. 5 and 6, first and second imaginary straight lines L1, L2 extend perpendicular to the median plane M and intersect one of the top corner cutting edge's first and second corner end points NC1, NC2, respectively.

In some embodiments of the present invention, the first imaginary straight line L1 may intersect the insert boundary line LB.

Also, in some embodiments of the present invention, the second imaginary straight line L2 may pass through the median plane M inside the insert boundary line LB.

As shown in FIGS. 1 to 3, each corner surface 28 may include a top corner relief surface 58 adjacent the respective top corner cutting edge 38.

For embodiments of the present invention in which the second imaginary straight line L2 passes through the median plane M inside the insert boundary line LB, it should be appreciated that each top corner relief surface 58 may be partially conical and taper in a direction away from the median plane M, so that each top minor cutting edge 44 is beneficially supported and advantageously robust.

In some embodiments of the present invention, a third imaginary straight line L3 extending perpendicular to the median plane M and intersecting one of the top major cutting edge 36 at any point along its length, may pass through the median plane M inside the insert boundary line LB.

In some embodiments of the present invention, the top and bottom end surfaces 22, 122 may be identical.

For embodiments of the present invention in which the top and bottom end surfaces 22, 122 are identical, it should be appreciated throughout the figures, description and claims that all the features associated with the bottom end surface 122 have been allocated the same reference numeral as the corresponding features associated with the top end surface 22, except they will be preceded by an extra one 'hundreds' digit.

In some embodiments of the present invention, the cutting insert 20 may exhibit two-fold rotational symmetry about a first axis A1 formed at the intersection of the first vertical plane PV1 and the median plane M.

Also, in some embodiments of the present invention, the cutting insert 20 may exhibit two-fold rotational symmetry about a second axis A2 formed at the intersection of the second vertical plane PV2 and the median plane M.

Further, in some embodiments of the present invention, the cutting insert 20 may exhibit four-fold rotational symmetry about the insert axis AI.

Another aspect of the present invention relates to a cutting tool 60 rotatable about a tool axis AT in a direction of rotation RD, as shown in FIGS. 7 to 12. The cutting tool 60 has a tool body 62 extending in a forward-to-rearward direction DF, DR along the tool axis AT, and at least one reversible cutting insert 20 removably secured in an insert receiving pocket 64 of the tool body 62.

In some embodiments of the present invention, the cutting tool 60 may have N cutting inserts 20 removably secured in N insert receiving pockets 64 circumferentially spaced around the tool body 62, N being a positive integer greater than one.

It should be appreciated throughout the description and claims, that since N is a specific integer number greater than one, the plurality of cutting inserts 20 are equal in number to the plurality of insert receiving pockets 64.

Figure 7:
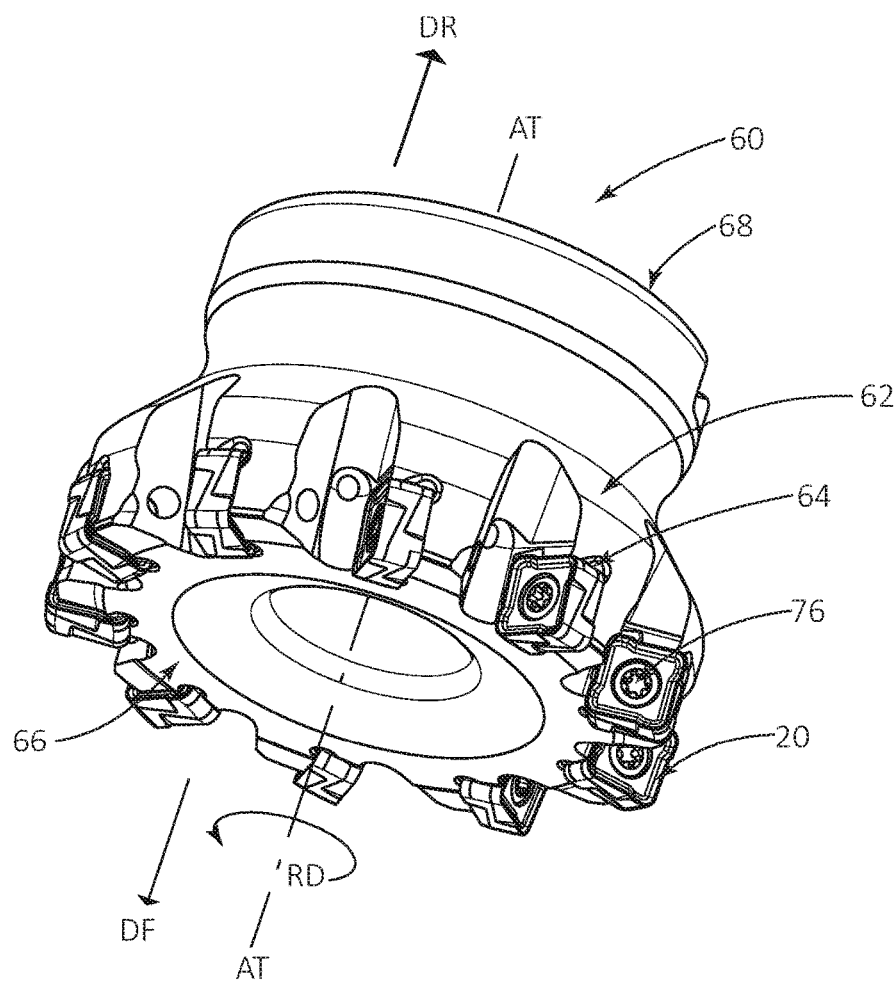
FIG. 7 is a perspective view of a cutting tool in accordance with some embodiments of the present invention.
Figure 8:
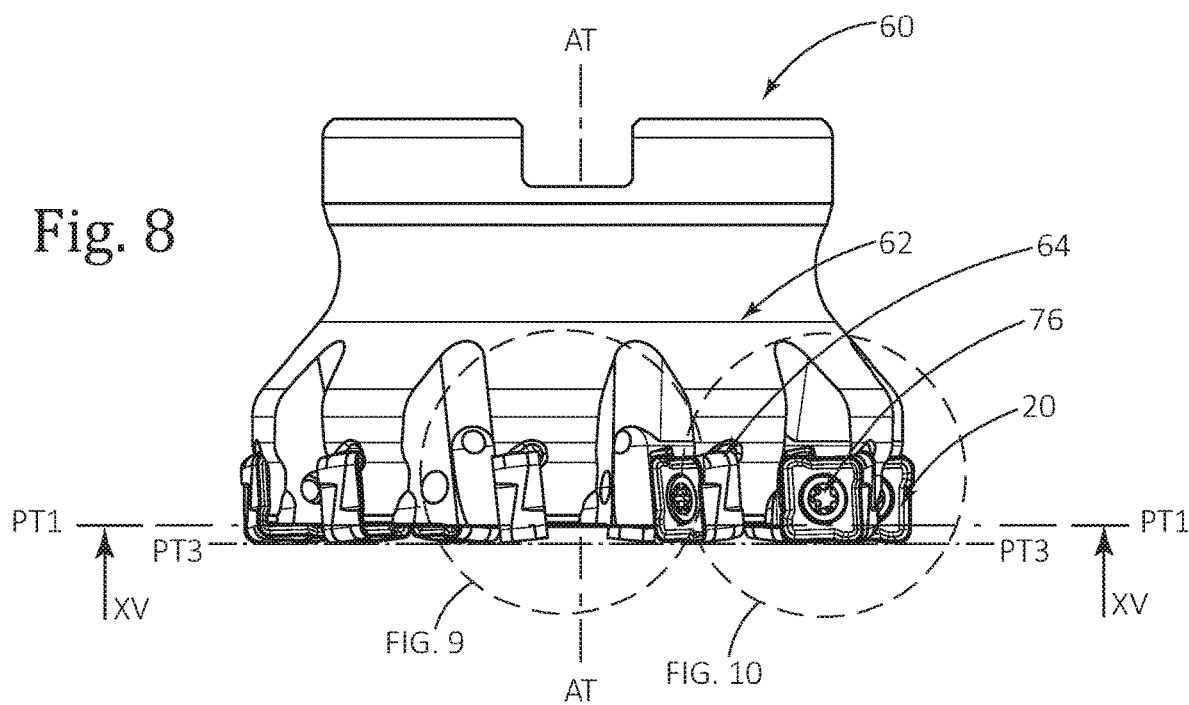
FIG. 8 is a side view of the cutting tool shown in FIG. 7.

As shown in FIGS. 7 and 8, the tool body 62 may have axially opposing front and rear body ends 66, 68.

In some embodiments of the present invention, each insert receiving pocket 64 may open out to the front body end 66.

Also, in some embodiments of the present invention, the cutting tool 60 may exhibit N-fold rotational symmetry about the tool axis AT.

Figure 13:
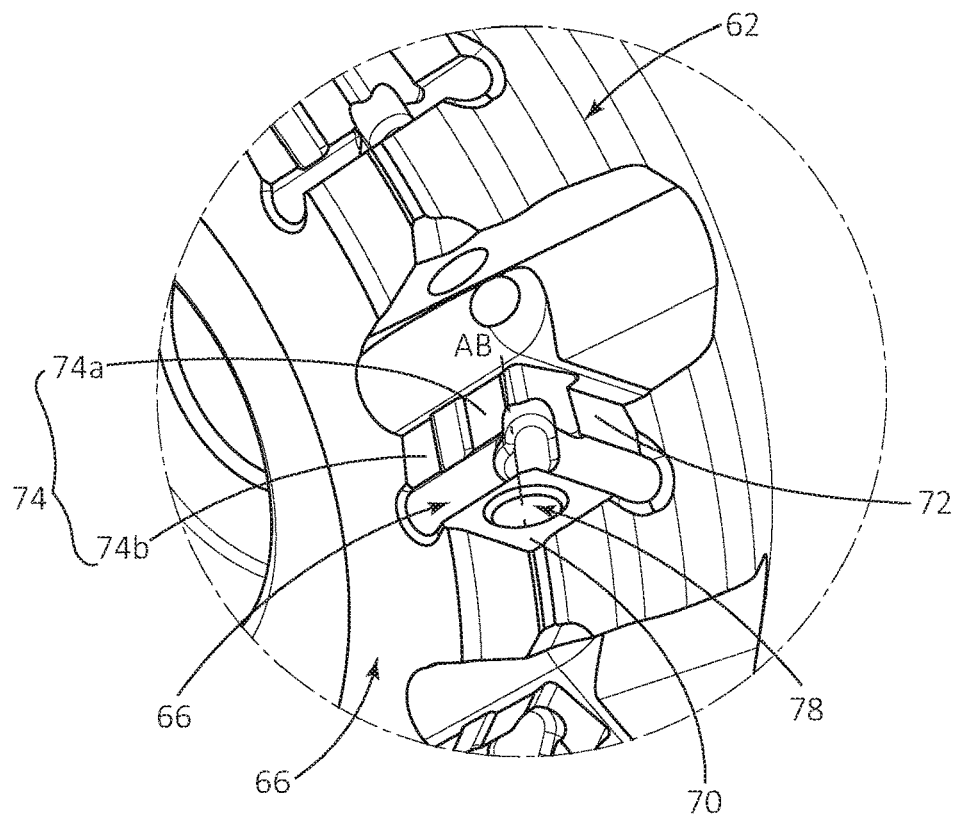
FIG. 13 is a first detailed view of the cutting tool shown in FIG. 7, with cutting inserts and clamping screws removed.
Figure 14:
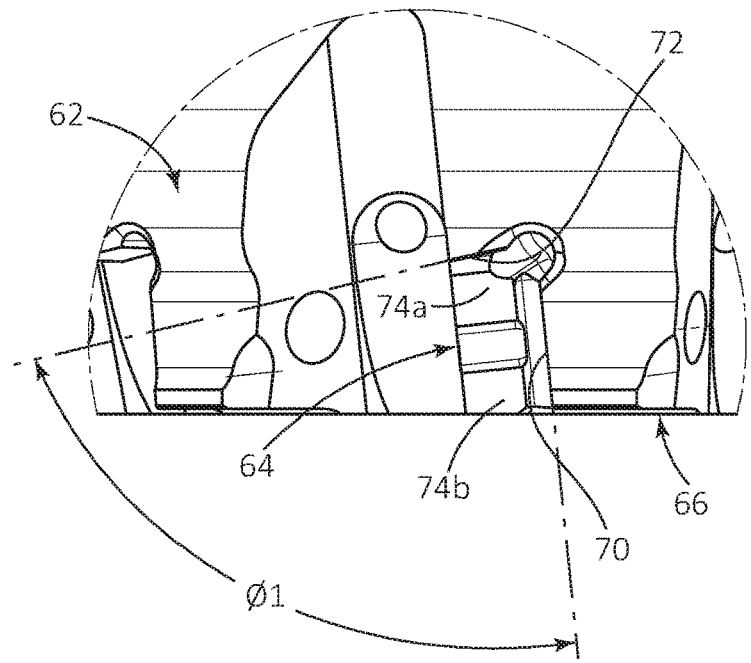
FIG. 14 is a third detailed view of the cutting tool shown in FIG. 8, with cutting inserts and clamping screws removed.

As shown in FIGS. 13 and 14, each insert receiving pocket 64 may have a seat surface 70 with axial and radial support walls 72, 74 transverse thereto.

In some embodiments of the present invention, the seat surface 70 may face in the direction of rotation RD.

Also, in some embodiments of the present invention, the seat surface 70 may be planar.

Further, in some embodiments of the present invention, the axial support wall 72 may face axially forwardly, and the radial support wall 74 may face radially outwardly.

In a secured state of the at least one reversible cutting insert 20 in its respective insert receiving pocket 64:

the bottom end surface 122 may be in clamping contact with the seat surface 70, a first one of the four side surfaces 26a may be in clamping contact with the axial support wall 72, and a second one of the four side surfaces 26b may be in clamping contact with the radial support wall 74.

For embodiments of the present invention in which the top and bottom end surfaces 22, 122 are identical, the bottom end surface 122 may have a bottom central surface 140, and the bottom central surface 140 may be in clamping contact with the seat surface 70.

As shown in FIGS. 7 and 13, a clamping screw 76 may extend through the through bore 30 and threadingly engage a screw bore 78 having a bore axis AB in the seat surface 70.

In some embodiments of the present invention, the insert axis AI may be offset from the bore axis AB.

For embodiments of the present invention in which the insert axis AI is offset from the bore axis AB, it should be appreciated that clamping contact is ensured, between the cutting insert's first and second side surfaces 26a, 26b and the insert receiving pocket's axial and radial support walls 72, 74, respectively, upon tightening of the clamping screw 76.

Figure 15:
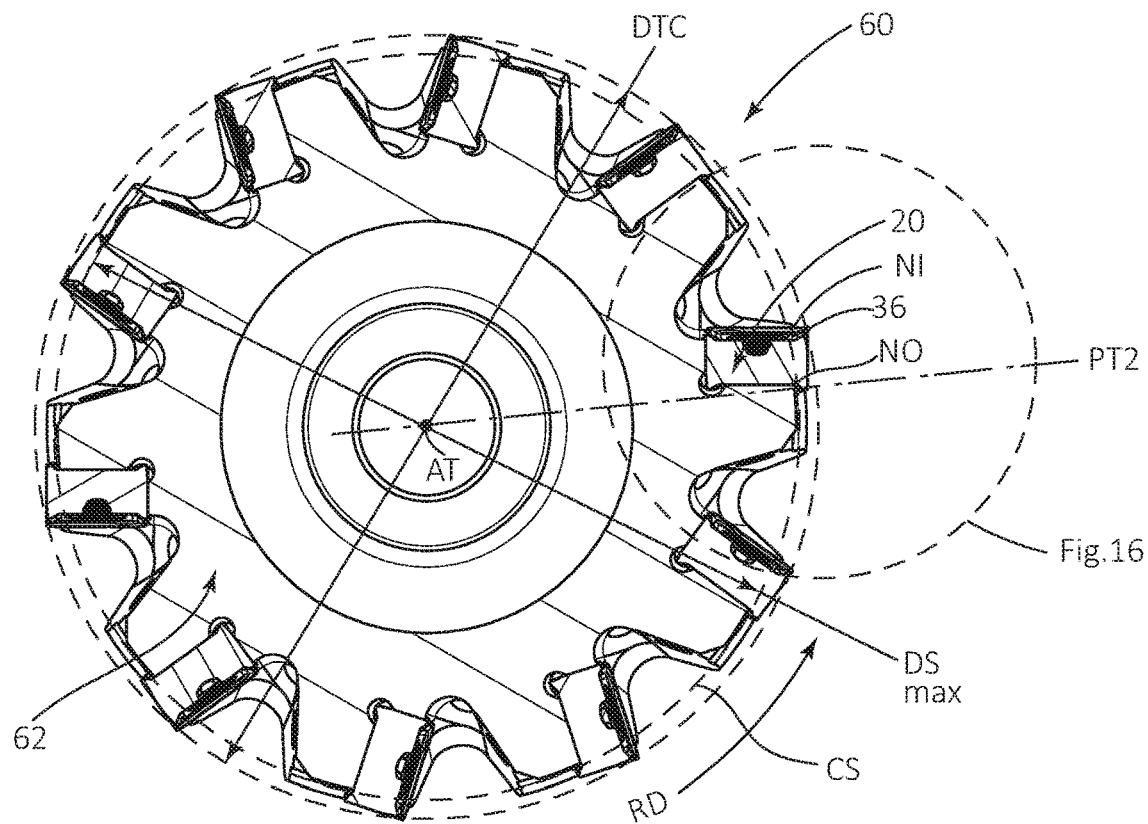
FIG. 15 is a cross-sectional view of the cutting tool shown in FIG. 8, taken along the line XV-XV.
Figure 16:
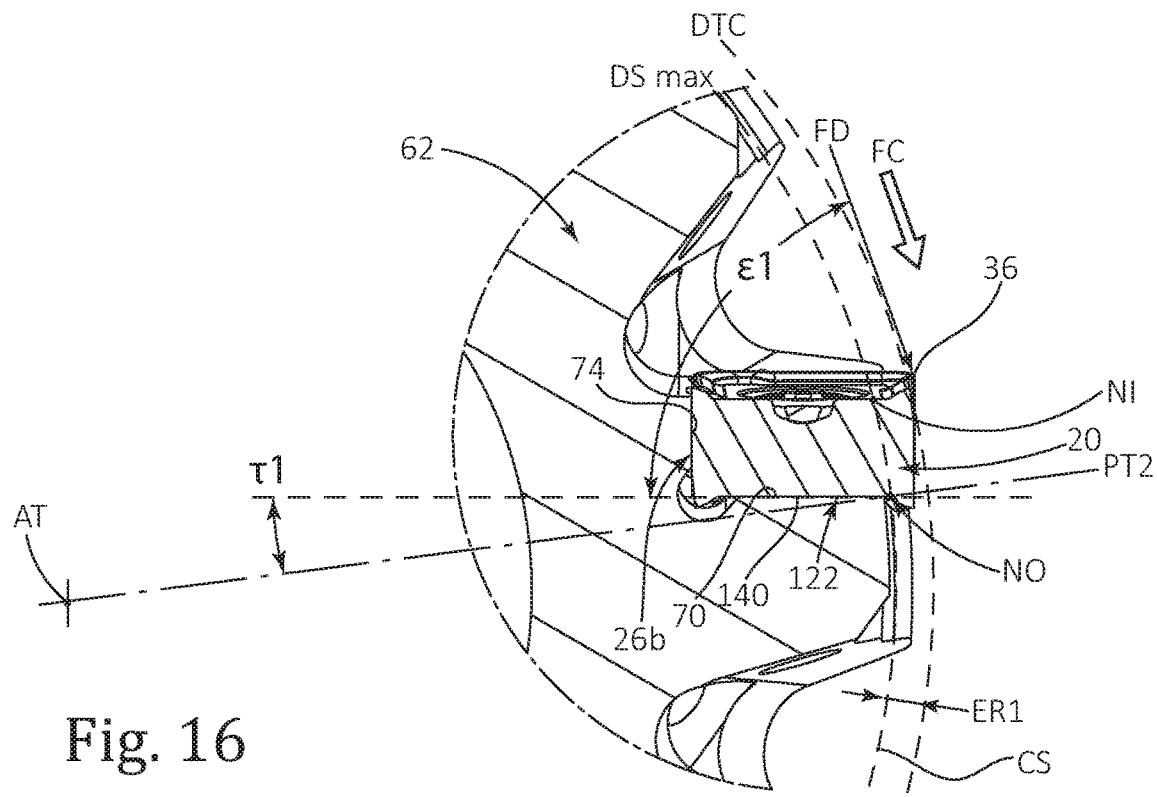
FIG. 16 is a detailed view of the cutting tool shown in FIG. 15.

As shown in FIGS. 15 and 16, in a cross-sectional view taken in a first tool plane PT1 perpendicular to the tool axis AT and intersecting the at least one seat surface 70, a second tool plane PT2 contains the tool axis AT and a radially outermost seat point NO of one of the seat surfaces 70.

In some embodiments of the present invention, the said seat surface 70 may form an acute internal radial pocket angle T1 with the second tool plane PT2.

Also, in some embodiments of the present invention, it should be appreciated that the radially outermost seat point NO may not only be the radially outermost point of the seat surface 70 in the cross-sectional view taken in the first tool plane PT1, but the absolute radially outermost point of the seat surface 70, relative to the tool axis AT.

For embodiments of the present invention in which each seat surface 70 faces in the direction of rotation RD and the radial pocket angle T1 is an internal angle, as opposed to an external angle, it should be appreciated that reduced circumferential spacing between adjacent insert receiving pockets 64 may be achieved whilst successfully orienting and threadingly engaging each clamping screw 76 into the respective insert receiving pocket's screw bore 78 via the respective cutting insert's through bore 30 without obstruction from an adjacent rotationally leading portion of the tool body 62.

In some embodiments of the present invention, the radial pocket angle $\tau 1$ may have a value greater than 3 degrees, i.e. $\tau 1 > 3°$.

As shown in FIG. 15, the N radially outermost seat points NO of the N seat surfaces 70 define an imaginary seat circle CS having a maximum seat diameter $DS_{MAX}$.

In some embodiments of the present invention, it should be appreciated that the imaginary seat circle CS may have a center coincident with the tool axis AT.

In some embodiments of the present invention, in the secured state of the at least one reversible cutting insert 20, the bottom end surface 122 of each cutting insert 20 may be in contact with the respective radially outermost seat point NO.

Also, in some embodiments of the present invention, in the secured state of the at least one reversible cutting insert 20, the bottom central surface 140 of each cutting insert 20 may be in contact with the respective radially outermost seat point NO.

Figure 9:
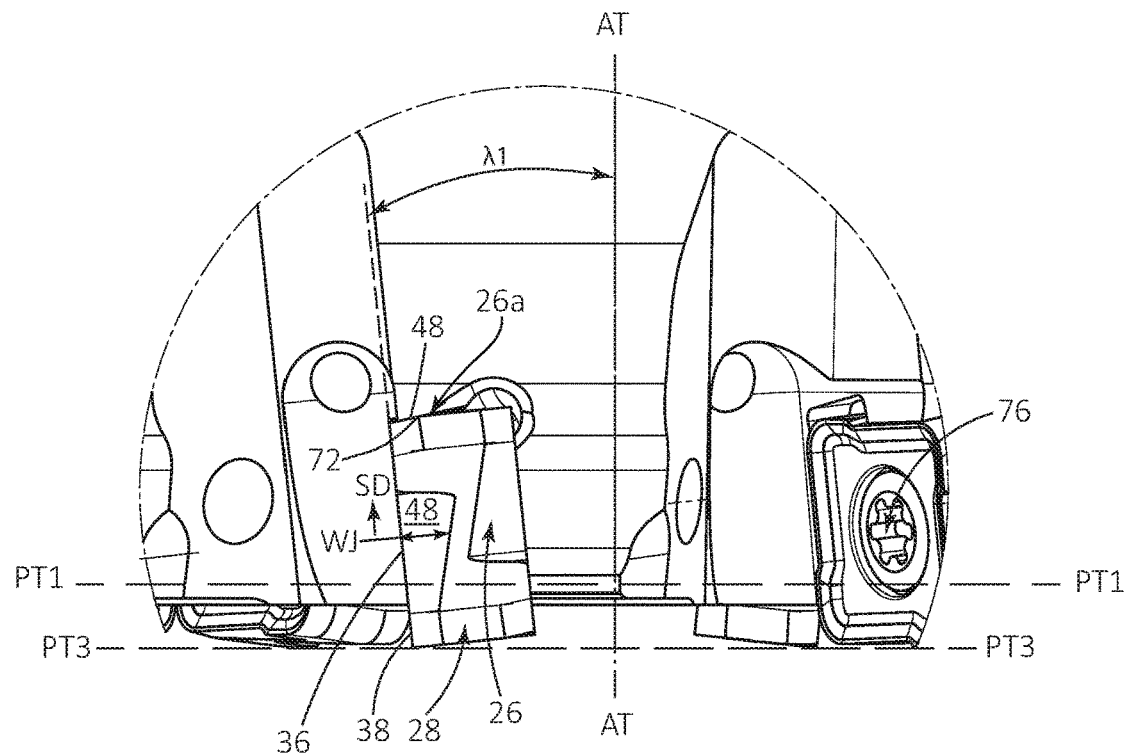
FIG. 9 is a first detailed view of the cutting tool shown in FIG. 8.

As shown in FIGS. 9 and 16, the top major relief surface 48 of the first side surface 26a may make clamping contact with the axial support wall 72, and the median surface 46 of the second side surface 26b may make clamping contact with the axial support wall 74.

As shown in FIG. 14, the axial support wall 72 may form an acute external axial support angle φ1 with the seat surface 70.

For embodiments of the present invention in which the axial support wall 72 forms an acute external axial support angle φ1 with the seat surface 70, it should be appreciated that that the axial support wall 72 is configured to provide 'dove-tail' clamping.

In some embodiments of the present invention, the acute axial support angle φ1 may have a value less than or equal to 85 degrees, i.e. φ1≤85°.

Also, in some embodiments of the present invention, the acute axial support angle φ1 may correspond with the top major relief angle β1.

For embodiments of the present invention in which the acute external axial support angle φ1 corresponds with the top major relief angle β1, it should be appreciated that that dove-tail clamping contact may occur between the axial support wall 72 and the top major relief surface 48 of the first side surface 26a.

Also, for embodiments of the present invention in which dove-tail clamping contact occurs between the axial support wall 72 and the top major relief surface 48 of the first side surface 26a, it should be appreciated that the cutting insert 20 may be removably secured in its respective insert receiving pocket 64 with a high level of stability.

As shown in FIG. 16, the radial support wall 74 may be perpendicular to the seat surface 70.

In some embodiments of the present invention, the radial support wall 74 may include two axially spaced apart radial support sub-walls 74a, 74b, with respect to the tool axis AT.

As shown in FIGS. 7 to 12, one of the top corner cutting edges 38 of each cutting insert 20 is operative, and one of the top major cutting edges 36 of each cutting insert 20, adjacent the operative top corner cutting edge 38, is operative.

It should be appreciated throughout the description and claims, that the cutting insert 20 may have four index positions on the top end surface 22, and in each index position, a different one of the top corner cutting edges 38 is operative, and a different one of the top major cutting edges 36 is operative.

It should also be appreciated that the cutting insert 20 is reversible and may also be described as being 'double-sided' or 'double-ended', such that in the secured state in its respective insert receiving pocket 64, the top end surface 22 may be in contact with the seat surface 70, and for embodiments in which the top and bottom end surfaces 22, 122 are identical, the bottom end surface 122 may have four bottom major cutting edges 136, one of which is operative, and four bottom corner cutting edges 138, one of which is operative.

Figure 10:
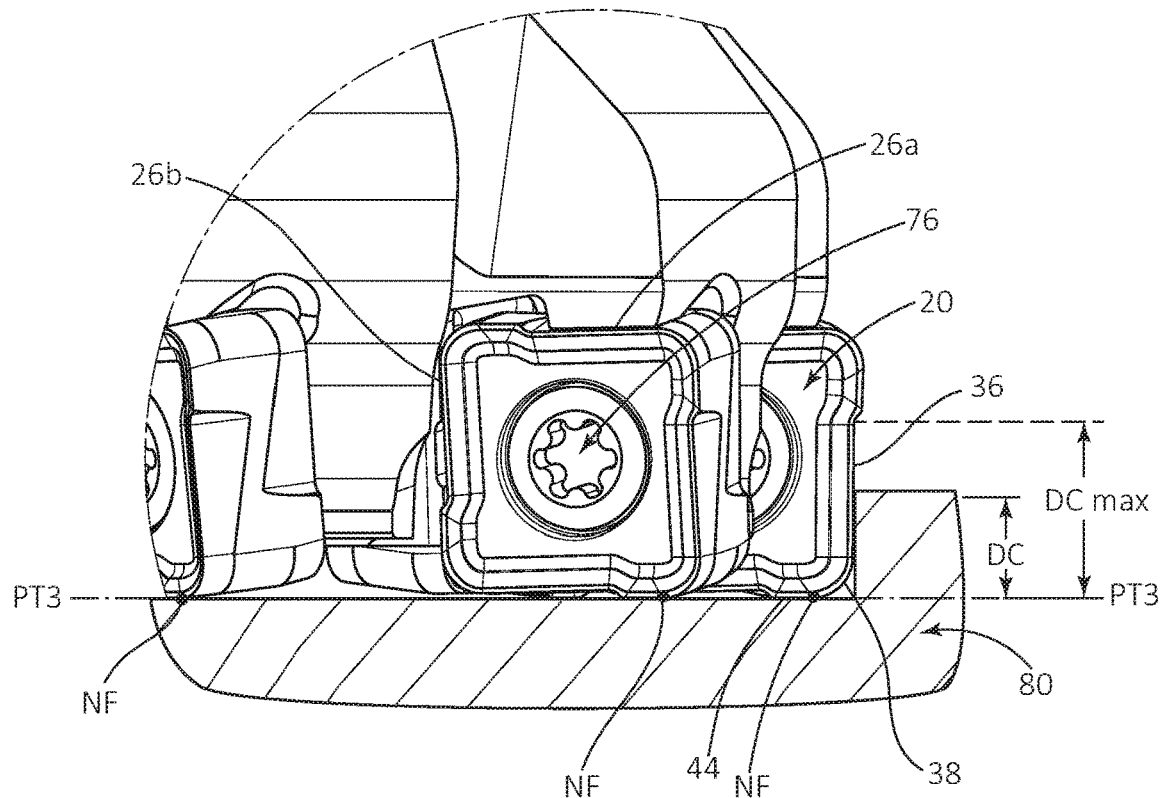
FIG. 10 is a second detailed view of the cutting tool shown in FIG. 8.

As shown in FIGS. 9 and 10, the top major relief width WJ of the top major relief surface 48 associated with the operative top major cutting edge 36 may increase in the sideways direction SD away from the operative top corner cutting edge 38.

As shown in FIG. 9, the operative top major cutting edge 36 of each cutting insert 20 may have a negative axial rake angle $\lambda 1$.

In some embodiments of the present invention, the negative axial rake angle $\lambda 1$ may have a magnitude greater than 3 degrees.

Figure 11:
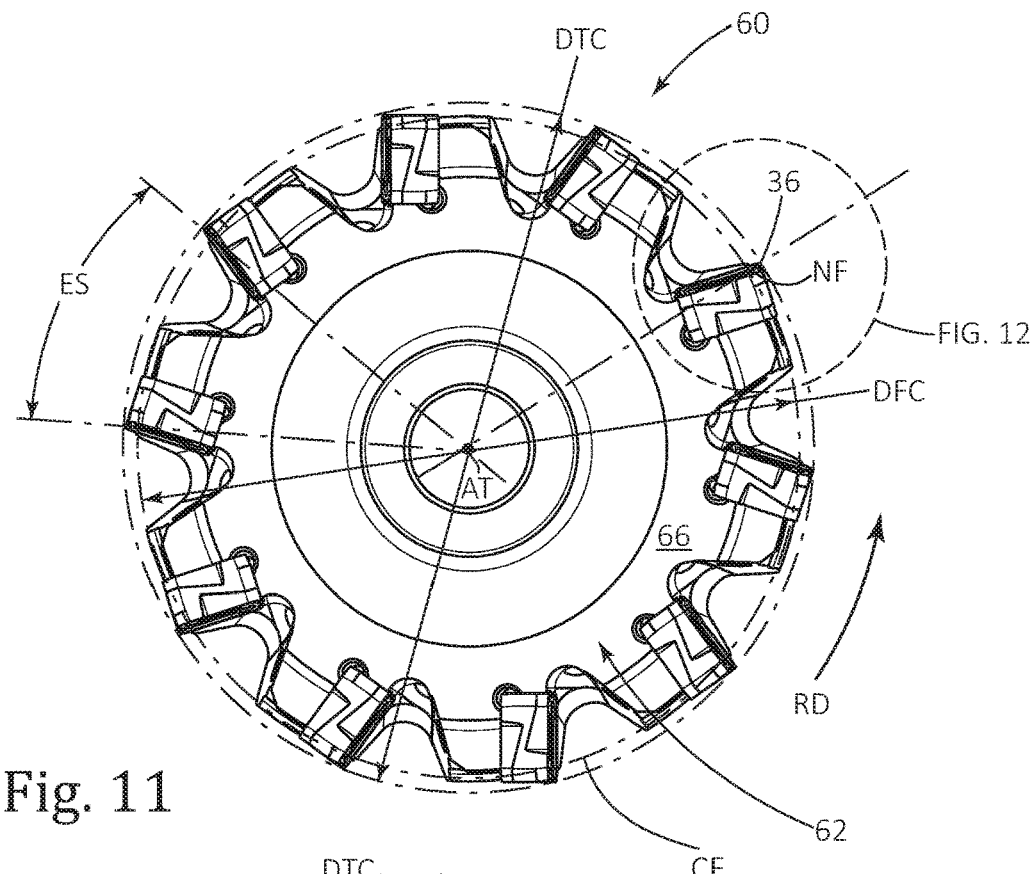
FIG. 11 is an end view of the cutting tool shown in FIG. 7.
Figure 12:
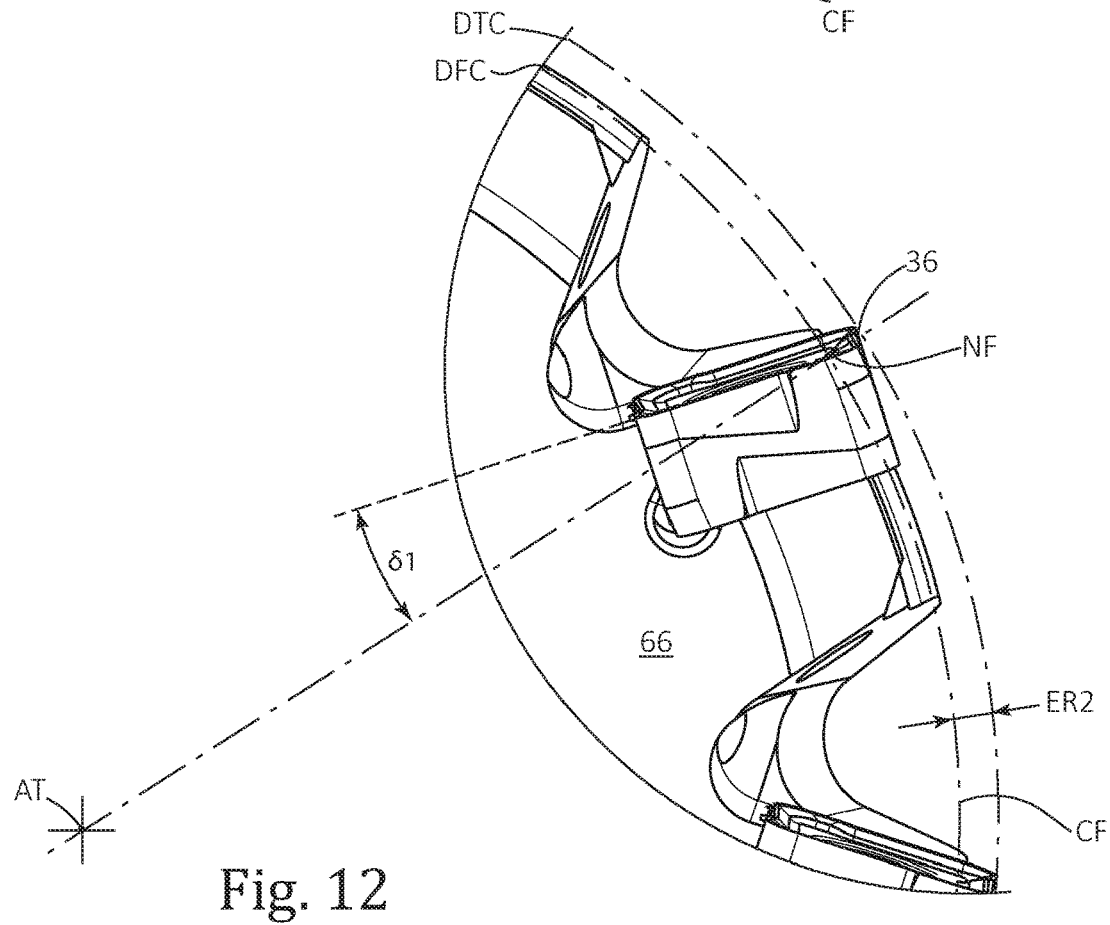
FIG. 12 is a detailed view of the cutting tool shown in FIG. 11.

Also, in some embodiments of the present invention, one of the top minor cutting edges 44 of each cutting insert 20, adjacent the operative top corner cutting edge 38, may be operative. As shown in FIGS. 11 and 12, the operative top minor cutting edge 44 of each cutting insert 20 may have a negative radial rake angle M.

In some embodiments of the present invention, the negative radial rake angle $\delta 1$ may be greater than the radial pocket angle $\tau 1$, and it should be appreciated that increasing the radial pocket angle $\tau 1$ results in an increased negative radial rake angle M.

Also, in some embodiments of the present invention, the negative radial rake angle $\delta 1$ may have a magnitude greater than 10 degrees.

For embodiments of the present invention in which the radial rake angle $\delta 1$ is a negative value, and particularly for embodiments in which the negative radial rake angle $\delta 1$ has a magnitude greater than 10 degrees, it should be appreciated that the cutting load on the top minor cutting edges 44 may be evenly distributed therealong, thus reducing the risk of edge fracture.

In some embodiments of the present invention, a radial clearance angle (not shown) between the operative top major relief surface 48 of each cutting insert 20 and a workpiece 80 may have a value between 5 and 10 degrees.

Whilst it should be generally appreciated from FIGS. 15 and 16, that increasing the radial pocket angle $\tau 1$ results in an increased radial clearance angle, by virtue of the top major relief surfaces 48 being configured as 'reversed' relief surfaces, higher values of radial pocket angle $\tau 1$ can be achieved whilst maintaining optimum values of the radial clearance angle, for example, between 5 and 10 degrees.

As shown in FIG. 16, a cutting force FC acting upon the operative top major cutting edge 36 of each cutting insert 36 is directed in a tangential force direction FD, and an acute radial tipping angle $\tau 1$ may be formed between the tangential force direction FD and the seat surface 70.

In some embodiments of the present invention, the radial tipping angle $\epsilon 1$ may have a value between 70 degrees and 80 degrees, i.e. $70°<\epsilon 1<80°$.

It should be generally appreciated from FIGS. 15 and 16, that increasing the radial pocket angle $\tau 1$ results in a decreased radial tipping angle $\epsilon 1$, which would normally be associated with reduced clamping stability. However, due to the dove-tail clamping contact between the axial support wall 72 and the top major relief surface 48 of the first side surface 26a of the respective cutting insert 20, higher values of radial pocket angle $\tau 1$ can be achieved whilst maintaining high levels of clamping stability.

As shown in FIGS. 11 and 15, the operative top major cutting edge 36 of each cutting insert 20 may define a tool cutting diameter DTC.

It is known in the art that the number N of cutting inserts 20 and the number N of insert receiving pockets 64 circumferentially spaced around the tool body 62 may be generally proportional to the tool cutting diameter DTC. In embodiments of the present invention configured with radial pocket angles $\tau 1$ which are internal angles, as opposed to external angles, reduced circumferential spacing between adjacent insert receiving pockets 64 may be achieved whilst successfully orienting and threadingly engaging each clamping screw 76 into the respective insert receiving pocket's screw bore 78 via the respective cutting insert's through bore 30 without obstruction from an adjacent rotationally leading portion of the tool body 62, such that the number N of insert receiving pockets 64 and the number N of cutting inserts 20 may be increased, for a given tool cutting diameter DTC.

In some embodiments of the present invention, N multiplied by a pocket spacing factor FP may equal the tool cutting diameter DTC, i.e. N*FP=DTC, and the pocket spacing factor FP may be equal to or less than 8.5, i.e. FP<8.5.

Also, in some embodiments of the present invention, the pocket spacing factor FP may be equal to or less than 8, i.e. FP<8.

It should be appreciated throughout the specification and claims, that the pocket spacing factor FP has units of millimeters, and the ratio of N to the tool cutting diameter DTC applies when the tool cutting diameter DTC is measured in millimeters.

For embodiments of the present invention in which N multiplied by a pocket spacing factor FP equals the tool cutting diameter DTC, i.e. N*FP=DTC, as shown in FIG. 11, it should be appreciated that an angular spacing extent ES (in degrees) between circumferentially adjacent insert receiving pockets 64 equals 360°/(DTC/FP), i.e. ES=360°/(DTC/FP).

As shown in FIGS. 15 and 16, half the difference between the tool cutting diameter DTC and the maximum seat diameter $DS_{MAX}$ defines a first radial extent ER1.

In some embodiments of the present invention, the first radial extent ER1 may be less than twenty-five percent of the top major diameter DJ, i.e. ER1<0.25*DJ.

For embodiments of the present invention in which the first radial extent ER1 is less than twenty-five percent of the top major diameter DJ, it should be appreciated that a radial tipping moment (not shown) of the cutting force FC about the respective radially outermost seat point NO is advantageously reduced.

As shown in FIG. 16, the imaginary seat circle CS intersects the top end surface 22 of each cutting insert 20 at a top intersection point NI.

In some embodiments of the present invention, the top intersection point NI and the operative top corner cutting edge 38 of the same cutting insert 20 may be located in the same one of the insert's four quadrants Q1, Q2, Q3, Q4, and thus the operative top corner cutting edge 38 may be well supported by the seat surface 70.

As shown in FIGS. 8 and 10, the cutting tool 60 has a cutting depth DC measured parallel to the tool axis AT.

In some embodiments of the present invention, a maximum cutting depth $DC_{MAX}$ of the cutting tool 60 in the forward direction DF along the tool axis AT may be greater than one-half of each insert's top major diameter DJ, i.e. $DC_{MAX}$>DJ/2.

Also, in some embodiments of the present invention, the maximum cutting depth $DC_{MAX}$ may be greater than one-half of each insert's median diameter DM, i.e. $DC_{MAX}$>DM/2.

For embodiments of the present invention in which the top major and top minor cutting edges 36, 44 associated with each top corner cutting edge 38 form the acute internal top corner angle α1 and/or each side surface 26 includes the top undercut 52 with respect to the undercut direction DU, it should be appreciated that a portion of the cutting insert 20 located axially rearward of the operative top major cutting edge 36, with respect to the tool axis AT, may extend radially beyond the tool cutting diameter DTC, thus limiting the maximum cutting depth $DC_{MAX}$ to a value less than the insert's top major diameter DJ.

Although the maximum cutting depth $DC_{MAX}$ may be limited to a value less than the insert's top major diameter DJ, as shown in FIGS. 8 and 10, the cutting tool 60 may be used in milling operations, whereby each cutting insert 20 is oriented in its respective insert receiving pocket 64 to cut a true ninety-degree, or square, shoulder in the workpiece 80.

As shown in FIGS. 10 to 12, each cutting insert 20 has an axially forwardmost insert point NF, and the N axially forwardmost insert points NF of the N cutting inserts 20 define an imaginary face circle CF having a face cutting diameter DFC.

In some embodiments of the present invention, it should be appreciated that the imaginary face circle CF may have a center coincident with the tool axis AT.

As shown in FIG. 12, half the difference between the tool cutting diameter DTC and the face cutting diameter DFC defines a second radial extent ER2.

In some embodiments of the present invention, the second radial extent ER2 may be less than twenty percent of the top major diameter DJ, i.e. ER2<0.20*DJ.

For embodiments of the present invention in which the cutting tool 60 has a N cutting inserts 20 and N insert receiving pockets 64, it should be appreciated that the plurality of axially forwardmost insert points NF may be contained in a third tool plane PT3 (also referred to as a "face milling plane PT3") perpendicular to the tool axis AT.

In some embodiments of the present invention, each axially forwardmost insert point NF may be contained in its associated operative top corner cutting edge 38.

Also, in some embodiments of the present invention, each axially forwardmost insert point NF may be coincident with the first corner end point NC1 of its associated operative top corner cutting edge 38, and the operative top minor cutting edge 44 may be substantially parallel to the third tool plane PT3.

For embodiments of the present invention in which the face cutting diameter DFC is relatively large and the second radial extent ER2 is less than twenty percent of the top major diameter DJ, it should be appreciated that the cutting tool 60 may be advantageously used in face milling operations to maximize the horizontal machined extent of the workpiece 80.

Also, for embodiments of the present invention in which the cutting tool 60 is used in milling operations, for example, face milling operations, it should be appreciated that the cutting path length of each cutting insert 20 in the workpiece 80, for each revolution of the cutting tool 60, may be proportional to the tool cutting diameter DTC, and the heat load generated by the cutting action of each cutting insert 20 may increase with increased tool cutting diameter DTC.

Although it is known in the art that increasing the size and mass of a cutting insert can contribute to dissipating the heat load generated by its cutting action, and that the median diameter DM of each cutting insert 20 may be related to the tool cutting diameter DTC, for embodiments of the present invention in which the cutting insert 20 is robustly configured with 'reversed' relief surfaces adjacent the top major cutting edges 36, the size of the cutting insert 20 relative to the tool cutting diameter DTC may be reduced.

In some embodiments of the present invention, the median diameter DM multiplied by an insert size factor FI may equal the tool cutting diameter DTC, i.e. DM*FI=DTC, and the insert size factor FI may be greater than 12, i.e. FI>12.

For embodiments of the present invention in which the insert size factor FI is greater than 12, it should be appreciated that that reducing the amount of cemented carbide required to produce smaller sized cutting inserts 20 results in less expensive manufacturing costs. Also, smaller sized cutting inserts 20 contribute to the reduced circumferential spacing between adjacent insert receiving pockets 64.

The present invention contemplates rotary cutting tools having a tool cutting diameter DTC less than 100 mm and an insert size factor FI greater than 12. Although, the abovementioned insert size factor FI of greater than 12 may be theoretically applied to cutting tools 60 having a tool cutting diameter DTC of less than 100 mm, it is acknowledged that practical factors associated with using excessively small diameter clamping screws 76 to removably secure smaller sized cutting inserts 20 in corresponding sized insert receiving pockets 64 may present challenges in such configurations.

It should be appreciated throughout the specification and claims, that the insert size factor FI has no units, and the ratio of the median diameter DM to the tool cutting diameter DTC applies when both the median diameter DM and the tool cutting diameter DTC are measured in the same units, for examples, millimeters.

Although the present invention has been described to a certain degree of particularity, it should be understood that various alterations and modifications could be made without departing from the spirit or scope of the invention as hereinafter claimed.

What is claimed is:

1. A reversible cutting insert (20), comprising:
opposing top and bottom end surfaces (22, 122) interconnected by a continuous peripheral surface (24), with a median plane (M) located between the top and bottom end surfaces (22, 122) and intersecting the peripheral surface (24) to form an insert boundary line (LB), and an insert axis (AI) perpendicular to the median plane (M) about which the cutting insert (20) is indexable,
the peripheral surface (24) including four side surfaces (26) circumferentially alternating with four corner surfaces (28),
the side and corner surfaces (26, 28) intersecting the top end surface (22) at top side and top corner edges (32, 34), respectively, with each top side edge (32) having a top major cutting edge (36), and each top corner edge (34) having a top corner cutting edge (38), and each side surface (26) including a median surface (46), and a top major relief surface (48) adjacent the respective top major cutting edge (36), wherein:

in a cross-sectional view taken along one of the top major cutting edges (36), the respective top major relief surface (48) forms an acute internal top major relief angle (($1) with the median plane (M), and the median plane (M) intersects the four median surfaces (46) to define an imaginary median square (SM) having an imaginary inscribed median circle (CM) with a median diameter (DM) and a center coincident with the insert axis (AI), wherein, in a top end view of the cutting insert (20):

the four top major cutting edges (36) define an imaginary top major square (SJ) having an imaginary inscribed top major circle (CJ) with a top major diameter (DJ) and a center coincident with the insert axis (AI), and the imaginary top major square (SJ) is rotationally offset from the imaginary median square (SM) about the insert axis (AI): and wherein in an end view of the cutting insert (20), no portion of the cutting insert (20) extends outside the insert boundary line (LB).

2. The cutting insert (20) according to claim 1, wherein the top major relief angle (β1) has a minimum value of 75 degrees and a maximum value of 85 degrees.

3. The cutting insert (20) according to claim 1, wherein the four top major cutting edges (36) are entirely contained in a top horizontal plane (PH) perpendicular to the insert axis (AI).

4. The cutting insert (20) according to claim 3, wherein the four top corner cutting edges (38) are entirely contained in the top horizontal plane (PH).

5. The cutting insert (20) according to claim 1, wherein each median surface (46) is perpendicular to the median plane (M).

6. The cutting insert (20) according to claim 1, wherein:

the imaginary median square (SM) is divided into four identical quadrants (Q1, Q2, Q3, Q4) by mutually perpendicular first and second vertical planes (PV1, PV2) containing the insert axis (AI) and intersecting the four side surfaces (26), and each top major cutting edge (36) is located in two of the four quadrants (Q1, Q2, Q3, Q4).

7. The cutting insert (20) according to claim 1, wherein the median diameter (DM) is greater than the top major diameter (DJ).

8. The cutting insert (20) according to claim 1, wherein, in a side view of the cutting insert (20):

the top major relief surface (48) has variable top major relief width (WJ) parallel to the insert axis (AI), and the top major relief width (WJ) increases in a sideways direction (SD) parallel to the median plane (M).

9. The cutting insert (20) according to claim 8, wherein:

each top side edge (32) also includes a top minor cutting edge (44), and in the side view of the cutting insert (20), the sideways direction (SD) is from the top major cutting edge (36) to the top minor cutting edge (44) of the same top side edge (32).

10. The cutting insert (20) according to claim 9, wherein: the four top minor cutting edges (44) define an imaginary top minor square (SN) having an imaginary inscribed top minor circle (CN) with a top minor diameter (DN), and in the top end view of the cutting insert (20), the imaginary top minor square (SN) is coincident with the imaginary median square (SM).

11. The cutting insert (20) according to claim 9, wherein, in the top end view of the cutting insert (20):

the top major and top minor cutting edges (36, 44) associated with each top corner cutting edge (38) form an acute internal top corner angle (a1).

12. The cutting insert (20) according to claim 1, wherein a third imaginary straight line (L3) extending perpendicular to the median plane (M) and intersecting one of the top major cutting edges (36) at any point along its length, passes through the median plane (M) inside the insert boundary line (LB).

13. The cutting insert (20) according to claim 1, wherein, in the top end view of the cutting insert (20):

the four top minor cutting edges (44) define an imaginary top minor square (SN);

the imaginary top major square (SJ) is nested within the imaginary top minor square (SN); and in each top side edge (32), the top major cutting edge (36) is recessed relative to the top minor cutting edge (44) and the top major cutting edge (36) is longer than the top minor cutting edge (44).

14. A cutting tool (60) rotatable about a tool axis (AT) in a direction of rotation (RD), comprising:

a tool body (62) extending in a forward-to-rearward direction (DF, DR) along the tool axis (AT); and at least one reversible cutting insert (20) in accordance with claim 1 removably secured in an insert receiving pocket (64) of the tool body (62), wherein:

one of the top corner cutting edges (38) of each cutting insert (20) is operative, and one of the top major cutting edges (36) of each cutting insert (20), adjacent the operative top corner cutting edge (38), is an operative top major cutting edge (36).

15. The cutting tool (60) according to claim 14, wherein the operative top major cutting edge (36) of each cutting insert (20) defines a tool cutting diameter (DTC).

16. The cutting tool (60) according to claim 15, wherein:

N cutting inserts (20) are removably secured in N insert receiving pockets (64) circumferentially spaced around the tool body (62), N being a positive integer greater than one, and the cutting tool (60) exhibits N-fold rotational symmetry about the tool axis (AT).

17. The cutting tool (60) according to claim 16, wherein: the tool cutting diameter (DTC), measured in millimeters, divided by N, is less than 8.5.

18. The cutting tool (60) according to claim 15, wherein:

an axially forwardmost insert point (NF) of each cutting insert (20) defines a face cutting diameter (DFC), half the difference between the tool cutting diameter (DTC) and the face cutting diameter (DFC) defines a second radial extent (ER2), and the second radial extent (ER2) is less than twenty percent of the top major diameter (DJ).

19. The cutting tool (60) according to claim 14, wherein:

each insert receiving pocket (64) has a seat surface (70) with axial and radial support walls (72, 74) transverse thereto, the axial support wall (72) facing axially forwardly, and the radial support wall (74) facing radially outwardly, the bottom end surface (122) of each cutting insert (20) is in clamping contact with its respective seat surface (70), a first one of the four side surfaces (26a) of each cutting insert (20) is in clamping contact with the axial support wall (72), and
a second one of the four side surfaces (26b) of each cutting insert (20) is in clamping contact with the radial support wall (74).

20. The cutting tool (60) according to claim 19, wherein:
the top major relief surface (48) of the first side surface (26a) makes clamping contact with the axial support wall (72), and
the median surface (46) of the second side surface (26b) makes clamping contact with the axial support wall (74).

21. The cutting tool (60) according to claim 20, wherein the axial support wall (72) forms an acute external axial support angle (φ1) with the seat surface (70).

22. The cutting tool (60) according to claim 19, wherein, in a cross-sectional view taken in a first tool plane (PT1) perpendicular to the tool axis (AT) and intersecting the at least one seat surface (70):
a second tool plane (PT2) containing the tool axis (AT) and a radially outermost point (NO) of one of the seat surfaces (70), forms an acute internal radial pocket angle (T1) with that seat surface (70).

23. The cutting tool (60) according to claim 14, wherein:
a maximum cutting depth ($DC_{MAX}$) of the cutting tool (60) in the forward direction (DF) along the tool axis (AT), is greater than one-half of each insert's top major diameter (DJ).

24. The cutting tool (60) according to claim 14, wherein:
each cutting insert (20) is oriented in its respective insert receiving pocket (64) such that, said each cutting insert (20) cuts a true ninety-degree shoulder in a workpiece (80), during a milling operation.

25. A reversible cutting insert (20), comprising:
opposing top and bottom end surfaces (22, 122) interconnected by a continuous peripheral surface (24), with a median plane (M) located between the top and bottom end surfaces (22, 122) and intersecting the peripheral surface (24) to form an insert boundary line (LB), and an insert axis (AI) perpendicular to the median plane (M) about which the cutting insert (20) is indexable,
the peripheral surface (24) including four side surfaces (26) circumferentially alternating with four corner surfaces (28),
the side and corner surfaces (26, 28) intersecting the top end surface (22) at top side and top corner edges (32, 34), respectively, with each top side edge (32) having a top major cutting edge (36), and each top corner edge (34) having a top corner cutting edge (38), and
each side surface (26) including a median surface (46), and a top major relief surface (48) adjacent the respective top major cutting edge (36),
wherein:
in a cross-sectional view taken along one of the top major cutting edges (36), the respective top major relief surface (48) forms an acute internal top major relief angle (β1) with the median plane (M), and
the median plane (M) intersects the four median surfaces (46) to define an imaginary median square (SM) having an imaginary inscribed median circle (CM) with a median diameter (DM) and a center coincident with the insert axis (AI),
wherein, in a top end view of the cutting insert (20):
the four top major cutting edges (36) define an imaginary top major square (SJ) having an imaginary inscribed top major circle (CJ) with a top major diameter (DJ) and a center coincident with the insert axis (AI), and
the imaginary top major square (SJ) is rotationally offset from the imaginary median square (SM) about the insert axis (AI),
and wherein the four top major cutting edges (36) are entirely contained in a top horizontal plane (PH) perpendicular to the insert axis (AI).

\* \* \* \* \*